United States Patent
Hu et al.

(10) Patent No.: US 8,532,046 B2
(45) Date of Patent: Sep. 10, 2013

(54) METHOD, SYSTEM, AND DEVICE FOR NETWORK HANDOFF

(75) Inventors: Shuhui Hu, Shenzhen (CN); Jie Zhao, Shenzhen (CN); Xin Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 13/096,832

(22) Filed: Apr. 28, 2011

(65) Prior Publication Data

US 2011/0200010 A1 Aug. 18, 2011

Related U.S. Application Data

(63) Continuation of application No. PCT/CN2009/074609, filed on Oct. 26, 2009.

(30) Foreign Application Priority Data

Oct. 28, 2008 (CN) .......................... 2008 1 0172501

(51) Int. Cl.
*H04W 4/00* (2009.01)

(52) U.S. Cl.
USPC ............................ 370/329; 370/338; 370/401

(58) Field of Classification Search
CPC . H04W 36/14; H04W 36/0033; H04W 76/02; H04L 47/824; H04L 47/805
USPC ................ 370/230, 235, 328, 329, 331, 338, 370/401
See application file for complete search history.

(56) References Cited

U.S. PATENT DOCUMENTS

| | | | |
|---|---|---|---|
| 2006/0072506 A1* | 4/2006 | Sayeedi et al. ................. | 370/331 |
| 2006/0200543 A1 | 9/2006 | Kong et al. | |
| 2008/0080428 A1 | 4/2008 | Jappila et al. | |
| 2008/0089293 A1 | 4/2008 | Madour et al. | |
| 2009/0207805 A1* | 8/2009 | Zou ............................... | 370/331 |
| 2009/0219888 A1* | 9/2009 | Chen et al. .................... | 370/331 |
| 2010/0027448 A1* | 2/2010 | Puthiyandyil et al. ........ | 370/310 |
| 2010/0303238 A1* | 12/2010 | Cakulev et al. ............... | 380/272 |
| 2010/0322163 A1* | 12/2010 | Bhalla et al. .................. | 370/329 |

FOREIGN PATENT DOCUMENTS

| | | |
|---|---|---|
| CN | 1980472 A | 6/2007 |
| CN | 101291535 A | 10/2008 |
| WO | WO 2008/044215 A2 | 4/2008 |

OTHER PUBLICATIONS

Written Opinion of the International Searching Authority, PCT/CN2009/074609, Dated Dec. 31, 2009, 4 pages.
International Search Report, PCT/CN2009/074609, dated Dec. 31, 2009, 4 pages.

(Continued)

*Primary Examiner* — Jung Park
(74) *Attorney, Agent, or Firm* — Slater & Matsil, L.L.P.

(57) ABSTRACT

A method, a system, and a device for network handoff is disclosed. A first evolved Access Network (eAN) sends a session transfer request to the target eAN that corresponds to the network handoff request. The first eAN receives a session transfer response from the target eAN. The first eAN sends a Traffic Channel Assignment (TCA) message to a User Equipment (UE) based on the session transfer response, so that the UE can switch from a Long Term Evolution (LTE) network to an evolved High Rate Packet Data (eHRPD) network based on the TCA message.

21 Claims, 8 Drawing Sheets

(56) References Cited

OTHER PUBLICATIONS

3rd Generation Partnership Project 2 "3GPP2", "E-Utran—eHRPD Connectivity and Interworking: Core Network Aspects," 3GPP2 X.S0057-0 Version 1.0, dated Apr. 2009, 154 pages.

3rd Generation Partnership Project 2 "3GPP2", "Interoperability Specification (IOS) for Evolved High Rate Packet Data (eHRPD) Radio Access Network Interfaces and Interworking with Enhanced Universal Terrestrial Radio Acess Network (E-UTRAN)," 3GPP2 A.S0022-0 V2.0, dated Apr. 2010, 220 pages.

* cited by examiner

METHOD, SYSTEM, AND DEVICE FOR NETWORK HANDOFF

CROSS-REFERENCE TO RELATED APPLICATIONS

This application is a continuation of International Application No. PCT/CN2009/074609, filed on Oct. 26, 2009, which claims priority to Chinese patent application No. 200810172501.2, filed on Oct. 28, 2008, both of which are hereby incorporated by reference in their entireties.

FIELD OF THE INVENTION

The present invention relates to communications technologies, and more particularly, to a method, a system, and a device for network handoff.

BACKGROUND OF THE INVENTION

Figure 1:
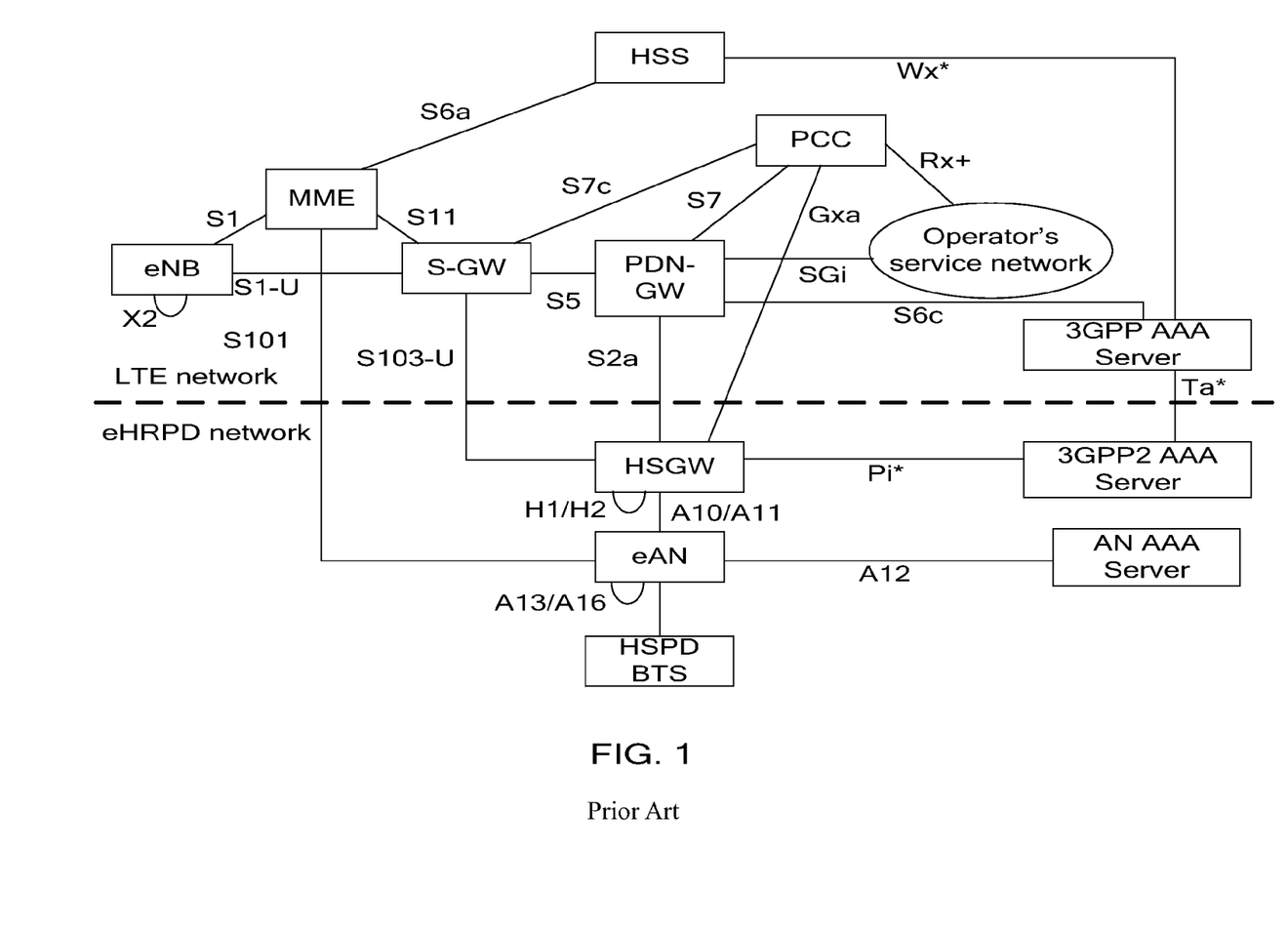
FIG. 1 illustrates architecture for the interworking between LTE and eHRPD networks in the prior art.

The interworking between the 3GPP-based and non-3GPP-based networks, especially the interworking between the Long Term Evolution (LTE) and the evolved High Rate Packet Data (eHRPD) networks, is a hot topic among the standardization organizations. FIG. 1 illustrates the architecture for the interworking between the LTE and the eHRPD networks. As show in FIG. 1, two interfaces are added between the LTE and eHRPD networks: S101 and S103-U. S101 is an interface between a Mobility Management Entity (MME) and an evolved Access Network (eAN). It is essentially a tunnel for forwarding signaling messages between a terminal and a target network to help the terminal to pre-register with the target network or switch from a source network to a target network. S103-U is an interface between a Serving Gateway (S-GW) and a High Rate Packet Data Serving Gateway (HSGW). It is used to forward registration data stored in an LTE network to an eHRPD network, which then forwards the data to a terminal.

When a UE switches from an LTE network to an eHRPD network, the UE first needs to pre-register with the eHRPD network, namely, to establish a connection with the eHRPD network before accessing it, including negotiating an air interface session with the eAN, performing authentication, establishing a Point to Point Protocol (PPP) connection, and so on. In this way, the switchover delay can be greatly reduced. After determining to switch to the eHRPD network, the UE requests for the establishment of an air interface connection with the eAN. The eAN allocates an air interface resource for the UE, and sends a Traffic Channel Assignment (TCA) message to the UE. After that, the UE can switch from the LTE network to the eHRPD network based on the TCA message.

During implementation of the present invention, the inventor found that the following defect exists in the prior art:

An evolved NodeB (eNB) in the LTE network can be statically set with only one HRPD SectorID that corresponds to the eNB. In this way, the UE can establish a connection with the eAN in the eHRPD network that corresponds to the HRPD SectorID, and finally switches to the eHRPD network. However, because one eNB may be covered by a plurality of eHRPD sectors, the eAN in the handoff request sent by the UE may be different from the eAN statically set by the eNB. As a result, the handoff fails.

SUMMARY OF THE INVENTION

A method, a system, and a device for network handoff are provided in the embodiments of the present invention to implement network handoff when the target eAN indicated in the handoff request sent by a UE is different from the eAN statically set by the eNB.

A method for network handoff is provided in an embodiment of the present invention. The method includes: sending, by a first eAN, a session transfer request to the target eAN that corresponds to the network handoff request; receiving, by the first eAN, the network handoff response from the target eAN; and sending, by the first eAN, a Traffic Channel Assignment (TCA) message to a User Equipment (UE) based on the session transfer response, so as to enable the UE to switch from a Long Term Evolution (LTE) network to an evolved High Rate Packet Data (eHRPD) network based on the TCA message.

A system for network handoff is provided in an embodiment of the present invention. The system includes a first eAN, target eAN, and UE, in which: the first eAN is configured to send a session transfer request to the target eAN that corresponds to a network handoff request, receive a session transfer response from the target eAN, and send a Traffic Channel Assignment (TCA) message to the UE based on the session transfer response, so as to enable the UE to switch from a Long Term Evolution (LTE) network to an evolved High Rate Packet Data (eHRPD) network based on the TCA message.

An eAN is provided in an embodiment of the present invention. The eAN includes: a session transfer request processing unit, configured to send a network handoff request to the target eAN that corresponds to the network handoff request; a session transfer response receiving unit, configured to receive a session transfer response from the target eAN; and a TCA sending unit, configured to send a TCA message to a UE based on the session transfer response received by the session transfer response receiving unit, so as to enable the UE to switch from an LTE network to an eHRPD network based on the TCA message.

An eAN is provided in an embodiment of the present invention. The eAN includes: a transfer request receiving unit, configured to receive a session transfer request containing session information of the UE, the address of the Packet Data Network Gateway (PDN-GW), and the Generic Routing Encapsulation (GRE) key of the uplink tunnel between the S-GW and the PDN-GW; a session information processing unit, configured to store the session information received by the transfer request receiving unit; a registration request sending unit, configured to send an HSGW a registration request containing the PDN-GW address and the GRE key of the uplink tunnel received by the transfer response receiving unit, so as to enable the HSGW to send uplink data to the PDN-GW by using the PDN-GW address and the GRE key of the uplink tunnel; a registration response receiving unit, configured to receive from the HSGW a registration response containing the HSGW address and the GRE key of the uni-directional tunnel from the S-GW to the HSGW; an air interface resource allocating unit, configured to allocate air interface resource for the UE; and a transfer response sending unit, configured to send a session transfer response containing information about the air interface resource, the HSGW address, and the GRE key of the uni-directional tunnel.

In embodiments of the present invention, the network handoff when the target eAN indicated in the handoff request sent by a UE is different from the eAN statically set by the eNB is implemented through the session transfer between the first eAN and the target eAN.

BRIEF DESCRIPTION OF THE DRAWINGS

To describe the technical solutions in the embodiments of the present invention or in the prior art more clearly, the following describes the accompanying drawings for illustrating such technical solutions. Apparently, the accompanying drawings described below are some embodiments of the present invention, and those skilled in the art can derive other drawings from such accompanying drawings without creative efforts.

DETAILED DESCRIPTION OF THE EMBODIMENTS

The making and using of the presently preferred embodiments are discussed in detail below. It should be The technical solutions in the embodiments of the present invention are described below clearly with reference to the accompanying drawings in the embodiments of the present invention. Apparently, the described embodiments are merely some of the embodiments of the present invention, rather than all of the embodiments. Based on the embodiments of the present invention, those skilled in the art can derive other embodiments without creative efforts, which all fall within the scope of the present invention.

Figure 2:
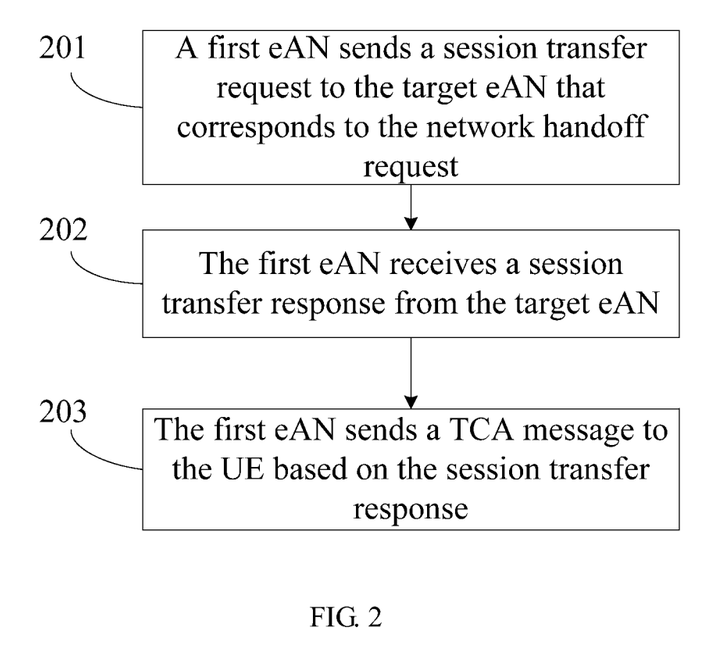
FIG. 2 is a flowchart of a network handoff method provided in an embodiment of the present invention.

A method for network handoff is provided in an embodiment of the present invention (shown in FIG. 2). The method includes the following steps:

Step 201: A first eAN sends a session transfer request to a second eAN that corresponds to a network handoff request.

Step 202: The first eAN receives a session transfer response from the second eAN.

Step 203: The first eAN sends a TCA message to a UE based on the session transfer response, so as to enable the UE to switch from an LTE network to an eHRPD network based on the TCA message.

In this embodiment of the present invention, the network handoff when the target eAN indicated in the handoff request sent by a UE is different from the eAN statically set by the eNB is implemented through the session transfer between the first eAN and the target eAN.

Figure 3:
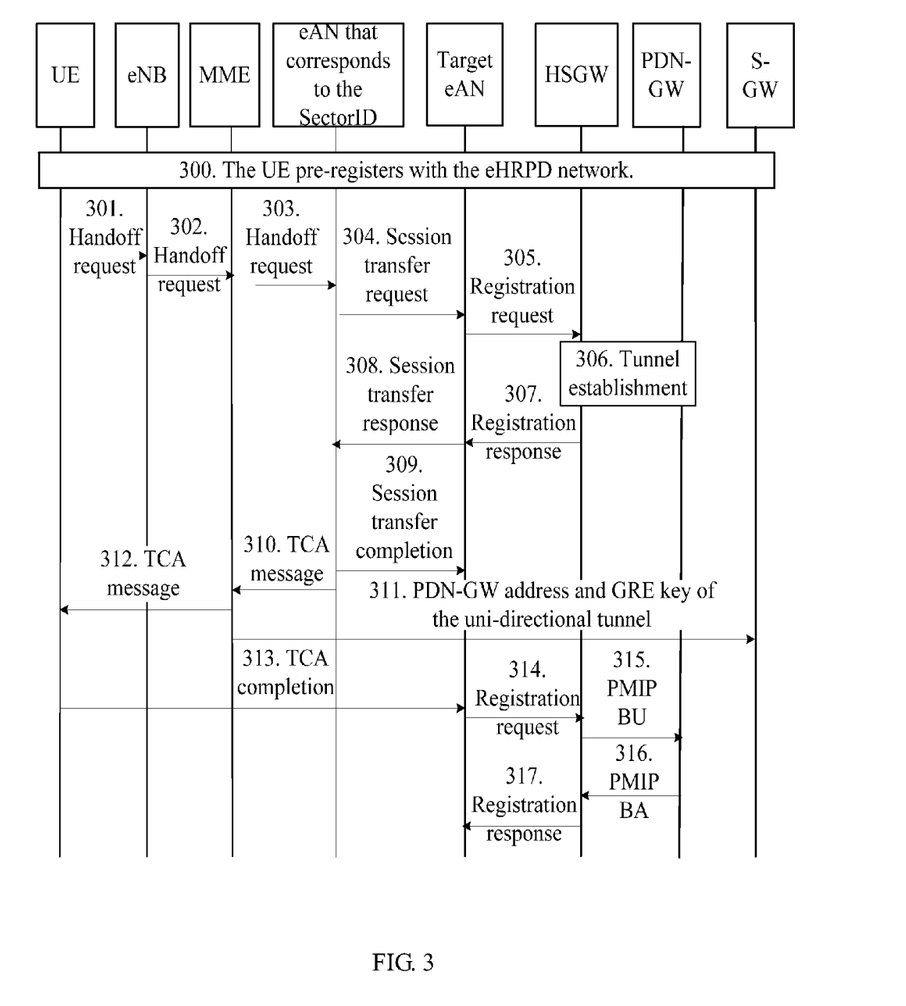
FIG. 3 is a flowchart of a network handoff method provided in an embodiment of the present invention.

A method for network handoff is provided in an embodiment of the present invention shown in FIG. 3. The method includes the following steps:

Step 300: The UE is currently in an LTE network but has pre-registered with the eHRPD network, and the eAN that completes pre-registration for the UE stores session information of the UE.

Step 301: The UE sends a network handoff request to the eNB to request access to the eHRPD network. The network handoff request includes HRPD Connection Request and Route Update Request.

Step 302: The eNB forwards the network handoff request to the MME, and adds a HRPD SectorID statically set by the eNB to the network handoff request.

Step 303: The MME adds a PDN-GW address and the GRE key of the uplink tunnel between the S-GW and the PDN-GW to the network handoff request, and forwards the network handoff request to the eAN that corresponds to the HRPD SectorID.

Step 304: When the eAN that corresponds to the HRPD SectorID is the eAN that stores the session information of the pre-registration of the UE, but the eAN detects that it is not the target eAN indicated by the parameter in the Route Update Request which the UE wants to access, the eAN corresponding to the HRPD SectorID sends a session transfer request to the target eAN corresponding to the Route Update Request in the network handoff request.

Specifically, the eAN that corresponds to the HRPD SectorID sends the target eAN a session transfer request containing the session information of the UE, the PDN-GW address, and the GRE key of the uplink tunnel between the S-GW and the PDN-GW.

Step 305: The target eAN sends a registration request containing the PDN-GW address and the GRE key of the uplink tunnel to the HSGW based on the session transfer request.

Step 306: Based on the PDN-GW address and the GRE key of the uplink tunnel, the HSGW establishes a temporary uplink tunnel between the HSGW and the PDN-GW, in which the uplink tunnel is used to forward uplink data after the UE switches to the eHRPD network.

Step 307: The HSGW sends the target eAN a registration response containing an HSGW address and the GRE key of the uni-directional tunnel from the S-GW to the HSGW.

Step 308: The target eAN allocates an air interface resource for the UE, updates session information based on settings of the target eAN, and sends a session transfer response containing updated session information, information about the air interface resource, HSGW address, and the GRE key of the uni-directional tunnel to the eAN that corresponds to the HRPD SectorID.

In addition, the target eAN can set a reverse initial power used by the UE to access the eHRPD network, allocate a new Unicast Access Terminal Identifier (UATI) for the UE, and add the reverse initial power and/or new UATI to the session transfer response, and then send the session transfer response to the UE through the eAN that corresponds to the HRPD SectorID. In this way, the UE can smoothly access the eHRPD network by using the reverse initial power; the UE can also use the long code mask of the traffic channel which is generated based on the new UATI, so as to enable the UATI allocated by a source eAN to be released and then allocated by the source eAN for another UE.

Step 309: After receiving the session transfer response, the eAN that corresponds to the HRPD SectorID stores the session information updated by the target eAN, and sends a session transfer completion message containing the updated session information to the target eAN to complete the session transfer.

Step 310: The eAN that corresponds to the HRPD SectorID sends the HSGW address, the GRE key of the uni-directional tunnel, and the TCA message containing information about the air interface resource and the reverse initial power to the MME based on the session transfer response.

Step 311: The MME forwards the HSGW address and the GRE key of the uni-directional tunnel to the S-GW, so as to enable the S-GW to establish, based on the HSGW address and the GRE key of the uni-directional tunnel, a uni-directional tunnel from the S-GW to the HSGW, in which the uni-directional tunnel is used to forward the downlink data buffered in the LTE network to the eHRPD network. That is, the S-GW forwards the downlink data sent from the eNB to the HSGW through the uni-directional tunnel from the S-GW to the HSGW; the HSGW buffers downlink data, and sends the downlink data to the UE after the UE switches to the eHRPD network.

Step 312: The MME sends a TCA message containing information about the air interface resource and the reverse initial power to the UE.

Step 313: The UE sends a Traffic Channel Complete (TCC) message to the target eAN based on the information about the air interface resource allocated by the target eAN and the reverse initial power.

Step 314: After receiving the TCC message, the target eAN sends a registration request to the HSGW to indicate that the UE is connected to the HRPD network. If the UE needs to send uplink data, the UE can send the data to the HSGW. The HSGW sends the data to the PDN-GW through the temporary uplink tunnel established in step 306.

Step 315: The HSGW sends a Proactive Mobile IP Binding Update (PMIP BU) request to the PDN-GW to request the establishment of an S2a tunnel with the PDN-GW.

Step 316: The PDN-GW sends a Proactive Mobile IP Binding Acknowledgment (PMIP BA) message to the HSGW to indicate that the S2a tunnel is established successfully. After that, the HSGW no longer sends uplink data through the temporary uplink tunnel established at step 306, but forwards uplink data and downlink data through the S2a tunnel.

Step 317: The HSGW returns a registration response to the target eAN through A11 (shown in FIG. 1), and the UE switches to the eHRPD network.

In this embodiment of the present invention, the network handoff when the target eAN indicated in the handoff request sent by a UE is different from the eAN statically set by the eNB is implemented through the session transfer between the first eAN and the target eAN.

Those skilled in the art should understand the following: In step 310, if the eAN that corresponds to the HRPD SectorID receives the reverse initial power and/or new UATI from the target eAN in step 308, it can also send the reverse initial power and/or new UATI to the MME.

Those skilled in the art should understand the following: In step 312, if the MME receives the reverse initial power and/or new UATI from the eAN that corresponds to the HRPD SectorID, it can also send the reverse initial power and/or new UATI to the UE.

Those skilled in the art should understand the following: In step 313, if the UE obtains the reverse initial power, it can send the TCC message to the target eAN based on the information about the air interface resource allocated by the target eAN and the reverse initial power; if the UE does not obtain the reverse initial power, it can send the TCC message to the target eAN based on the information about the air interface resource allocated by the target eAN.

Figure 4:
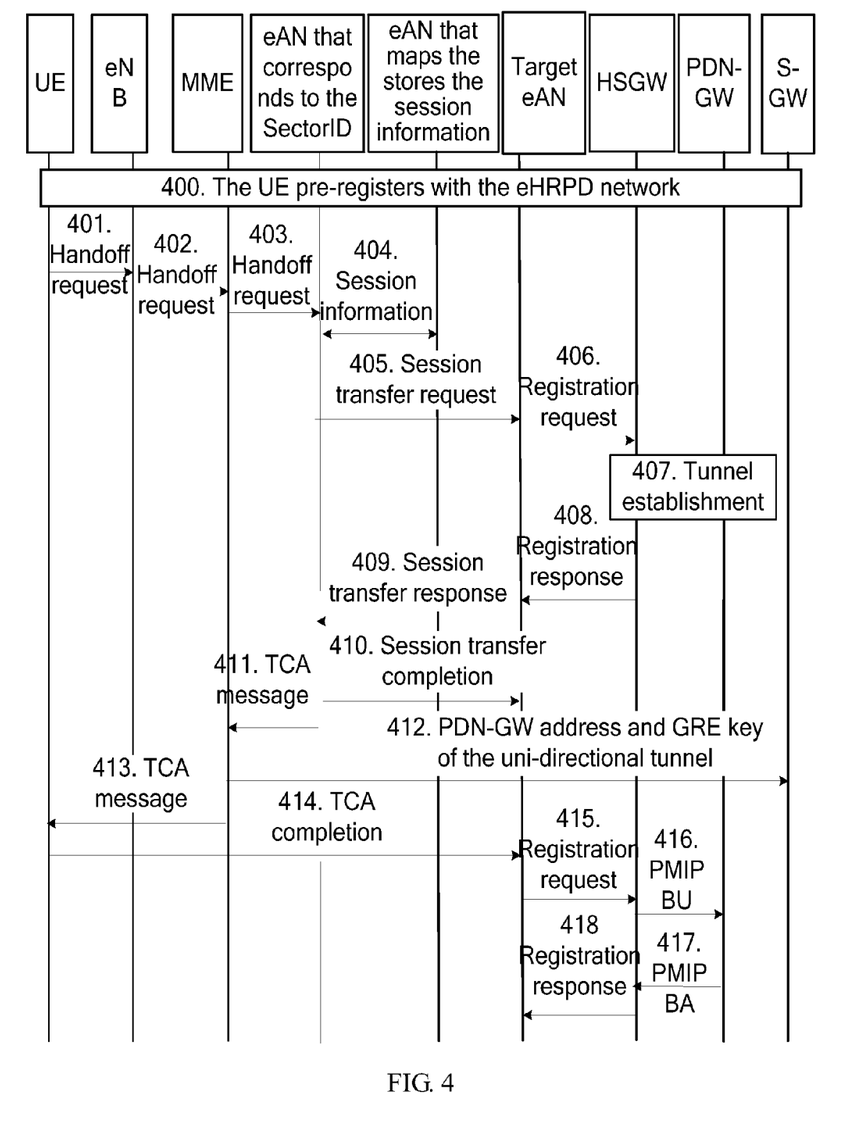
FIG. 4 is a flowchart of a network handoff method provided in an embodiment of the present invention.

A method for network handoff is provided in an embodiment of the present invention shown in FIG. 4. The method includes the following steps:

Step 400: The UE is currently in an LTE network but has pre-registered with the eHRPD network, and the eAN that completes pre-registration for the UE stores session information of the UE.

Step 401: The UE sends a network handoff request to the eNB to request access to the eHRPD network. The network handoff request includes HRPD Connection Request and Route Update Request.

Step 402: The eNB forwards the network handoff request to the MME, and adds the HRPD SectorID statically set by the eNB to the network handoff request.

Step 403: The MME adds a PDN-GW address and the GRE key of the uplink tunnel between the S-GW and the PDN-GW to the network handoff request, and forwards the network handoff request to the eAN that corresponds to the HRPD SectorID.

Step 404: If the eAN that corresponds to the HRPD SectorID is neither the eAN that stores the session information of the UE nor the target eAN indicated by the parameter in the Route Update Request which the UE wants to access, the eAN that corresponds to the HRPD SectorID obtains the session information of the UE from the eAN that stores the session information of the pre-registration of the UE through A13 (shown in FIG. 1).

Step 405: The eAN that corresponds to the HRPD SectorID sends a session transfer request to the target eAN indicated in the Route Update Request.

Specifically, the eAN that corresponds to the HRPD SectorID sends the target eAN a session transfer request containing the session information of the UE, the PDN-GW address, and the GRE key of the uplink tunnel between the S-GW and the PDN-GW.

Step 406: The target eAN sends a registration request containing the PDN-GW address and the GRE key of the uplink tunnel to the HSGW based on the session transfer request.

Step 407: Based on the PDN-GW address and the GRE key of the uplink tunnel, the HSGW establishes a temporary uplink tunnel between the HSGW and the PDN-GW, in which the uplink tunnel is used to forward uplink data after the UE switches to the eHRPD network.

Step 408: The HSGW sends the target eAN a registration response containing an HSGW address and the GRE key of the uni-directional tunnel from the S-GW to the HSGW.

Step 409: The target eAN allocates an air interface resource for the UE, updates session information based on settings of the target eAN, and sends a session transfer response containing updated session information, information about the air interface resource, HSGW address, and the GRE key of the uni-directional tunnel to the eAN that stores the session information.

In addition, the target eAN can set a reverse initial power used by the UE to access the eHRPD network, allocate a new UATI for the UE, and add the reverse initial power and/or new UATI to the session transfer response, and then send the session transfer response to the UE through the eAN that corresponds to the HRPD SectorID. In this way, the UE can smoothly access the eHRPD network by using the reverse initial power; the UE can also use the long code mask of the traffic channel which is generated based on the new UATI, so as to enable the UATI allocated by a source eAN to be released and then allocated by the source eAN for another UE.

Step 410: After receiving the session transfer response, the eAN that corresponds to the HRPD SectorID stores the session information updated by the target eAN, and sends a session transfer completion message containing the updated session information to the target eAN to complete the session transfer.

Step 411: The eAN that corresponds to the HRPD SectorID sends the HSGW address, the GRE key of the uni-directional tunnel, and the TCA message containing information about the air interface resource and the reverse initial power to the MME based on the session transfer response.

Step 412: The MME forwards the HSGW address and the GRE key of the uni-directional tunnel to the S-GW, so as to enable the S-GW to establish, based on the HSGW address and the GRE key of the uni-directional tunnel, a uni-directional tunnel from the S-GW to the HSGW, in which the uni-directional tunnel is used to forward the downlink data buffered in the LTE network to the eHRPD network. That is, the S-GW forwards the downlink data sent from the eNB to the HSGW through the uni-directional tunnel from the S-GW to the HSGW; the HSGW buffers the downlink data, and sends the downlink data to the UE after the UE switches to the eHRPD network.

Step 413: The MME sends a TCA message containing information about the air interface resource and the reverse initial power to the UE.

Step 414: The UE sends a TCC message to the target eAN based on the information about the air interface resource allocated by the target eAN and the reverse initial power.

Step 415: After receiving the TCC message, the target eAN sends a registration request to the HSGW to indicate that the UE is connected to the HRPD network. If the UE needs to send uplink data, it can send the data to the HSGW. The HSGW sends the data to the PDN-GW through the temporary uplink tunnel established in step 407.

Step 416: The HSGW sends a PMIP BU request to the PDN-GW to request the establishment of an S2a tunnel with the PDN-GW.

Step 417: The PDN-GW sends a PMIP BA message to the HSGW to indicate that the S2a tunnel is established successfully. After that, the HSGW no longer sends uplink data through the temporary uplink tunnel established in step 407, but forwards uplink data and downlink data through the S2a tunnel.

Step 418: The HSGW returns a registration response to the target eAN through A11 (shown in FIG. 1), and the UE switches to the eHRPD network. In this embodiment of the present invention, the network handoff when the target eAN indicated in the handoff request sent by a UE is different from the eAN statically set by the eNB is implemented through the session transfer between the first eAN and the target eAN.

Those skilled in the art should understand the following: In step 411, if the eAN that corresponds to the HRPD SectorID receives the reverse initial power and/or new UATI from the target eAN at step 409, it can also send the reverse initial power and/or new UATI to the MME.

Those skilled in the art should understand the following: In step 413, if the MME receives the reverse initial power and/or new UATI from the eAN that corresponds to the HRPD SectorID, it can also send the reverse initial power and/or new UATI to the UE.

Those skilled in the art should understand the following: In step 414, if the UE obtains the reverse initial power, it can send the TCC message to the target eAN based on the information about the air interface resource allocated by the target eAN and the reverse initial power; if the UE does not obtain the reverse initial power, it can send the TCC message to the target eAN based on the information about the air interface resource allocated by the target eAN.

Figure 5:
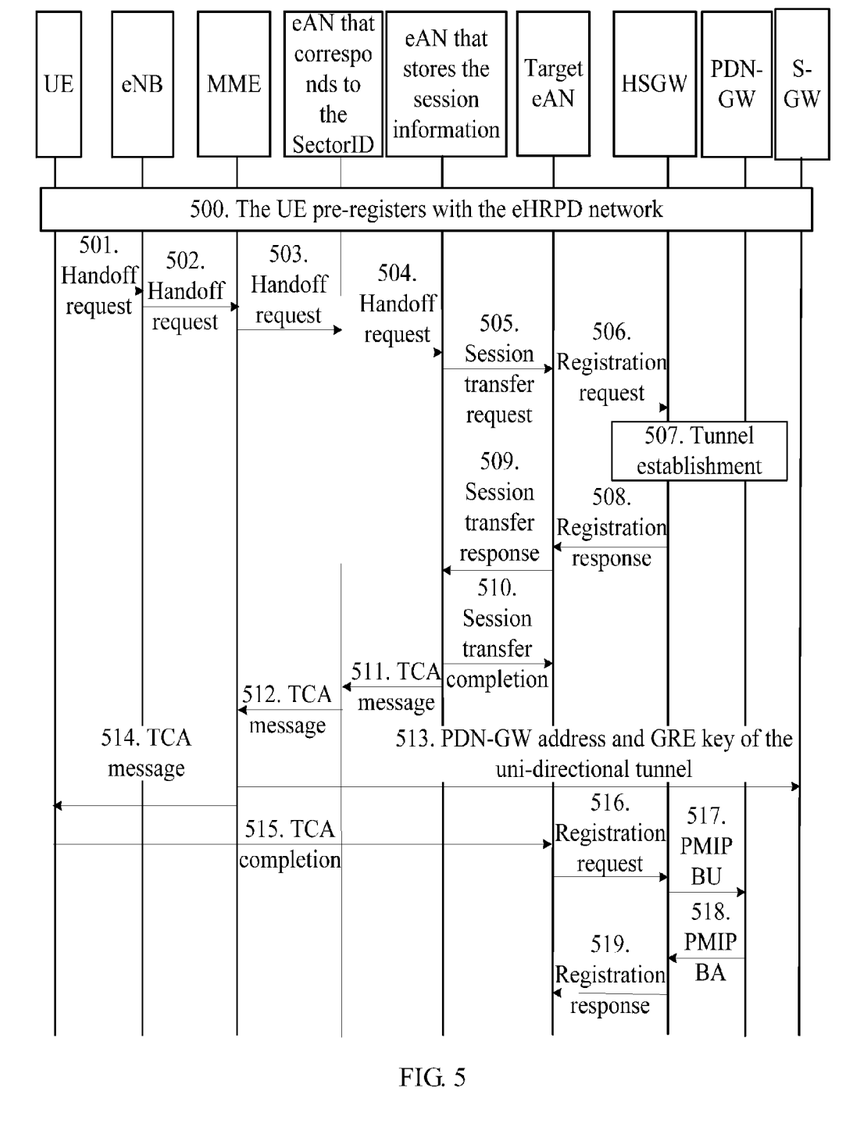
FIG. 5 is a flowchart of a network handoff method provided in an embodiment of the present invention.

A method for network handoff is provided in an embodiment of the present invention shown in FIG. 5. The method includes the following steps:

Step 500: The UE is currently in an LTE network but has pre-registered with the eHRPD network, and the eAN that completes pre-registration for the UE stores session information of the UE.

Step 501: The UE sends a network handoff request to the eNB to request access to the eHRPD network. The network handoff request includes HRPD Connection Request and Route Update Request.

Step 502: The eNB forwards the network handoff request to the MME, and adds the HRPD SectorID statically set by the eNB to the network handoff request.

Step 503: The MME adds a PDN-GW address and the GRE key of the uplink tunnel between the S-GW and the PDN-GW to the network handoff request, and forwards the network handoff request to the eAN that corresponds to the HRPD SectorID.

Step 504: If the eAN that corresponds to the HRPD SectorID is neither the eAN that stores the session information of the pre-registration of the UE nor the target eAN indicated by the parameter in the Route Update Request which the UE wants to access, the eAN that corresponds to the HRPD SectorID forwards the network handoff request to the eAN that stores the session information of the UE.

Step 505: If the eAN that stores the session information of the UE detects that it is not the target eAN indicated by the parameter in the Route Update Request which the UE wants to access, the eAN sends a session transfer request to the target eAN.

Specifically, the eAN that stores the session information sends the target eAN a session transfer request containing the session information of the UE, the PDN-GW address, and the GRE key of the uplink tunnel between the S-GW and the PDN-GW.

Step 506: The target eAN sends a registration request containing the PDN-GW address and the GRE key of the uplink tunnel to the HSGW based on the session transfer request.

Step 507: Based on the PDN-GW address and the GRE key of the uplink tunnel, the HSGW establishes a temporary uplink tunnel between the HSGW and the PDN-GW, in which the uplink tunnel is used to forward uplink data after the UE switches to the eHRPD network.

Step 508: The HSGW sends the target eAN a registration response containing an HSGW address and the GRE key of the uni-directional tunnel from the S-GW to the HSGW.

Step 509: The target eAN allocates an air interface resource for the UE, updates session information based on settings of the target eAN, and sends a session transfer response containing updated session information, information about the air interface resource, HSGW address, and the GRE key of the uni-directional tunnel to the eAN that stores the session information.

In addition, the target eAN can set a reverse initial power used by the UE to access the eHRPD network, allocate a new UATI for the UE, and add the reverse initial power and/or new UATI to the session transfer response, and then send the session transfer response to the UE through the eAN that corresponds to the HRPD SectorID. In this way, the UE can smoothly access the eHRPD network by using the reverse initial power; the UE can also use the long code mask of the traffic channel which is generated based on the new UATI, so as to enable the UATI allocated by a source eAN to be released and then allocated by the source eAN for another UE.

Step 510: After receiving the session transfer response, the eAN that stores the session information stores the session information updated by the target eAN, and sends a session transfer completion message containing the updated session information to the target eAN to complete the session transfer.

Step 511: In response to Step 504, the eAN that stores the session information sends the HSGW address, the GRE key of the uni-directional tunnel, and the TCA message containing information about the air interface resource and the reverse initial power to the eAN that corresponds to the HRPD SectorID.

Step 512: The eAN that corresponds to the HRPD SectorID sends the message received in step 511 to the MME.

Step 513: The MME forwards the HSGW address and the GRE key of the uni-directional tunnel to the S-GW, so as to enable the S-GW to establish, based on the HSGW address and the GRE key of the uni-directional tunnel, a uni-directional tunnel from the S-GW to the HSGW, in which the uni-directional tunnel is used to forward the downlink data buffered in the LTE network to the eHRPD network. That is, the S-GW forwards the downlink data sent from the eNB to the HSGW through the uni-directional tunnel from the S-GW to the HSGW; the HSGW buffers the downlink data, and sends the downlink data to the UE after the UE switches to the eHRPD network.

Step 514: The MME sends a TCA message containing information about the air interface resource and the reverse initial power to the UE.

Step 515: The UE sends a TCC message to the target eAN based on the information about the air interface resource allocated by the target eAN and the reverse initial power.

Step 516: After receiving the TCC message, the target eAN sends a registration request to the HSGW to indicate that the UE is connected to the HRPD network. If the UE needs to send uplink data, it can send the data to the HSGW. The HSGW 1 sends the data to the PDN-GW through the temporary uplink tunnel established in step 507.

Step 517: The HSGW sends a PMIP BU request to the PDN-GW to request the establishment of an S2a tunnel with the PDN-GW.

Step 518: The PDN-GW sends a PMIP BA message to the HSGW to indicate that the S2a tunnel is established successfully. After that, the HSGW no longer sends uplink data through the temporary uplink tunnel established in step 507, but forwards uplink data and downlink data through the S2a tunnel.

Step 519: The HSGW returns a registration response to the target eAN through AII shown in FIG. 1, and the UE switches to the eHRPD network.

In this embodiment of the present invention, the network handoff when the target eAN indicated in the handoff request sent by a UE is different from the eAN statically set by the eNB is implemented through the session transfer between the first eAN and the target eAN.

Those skilled in the art should understand the following: In step 511, if the eAN that stores the session information receives the reverse initial power and/or new UATI from the target eAN in step 509, it will send the reverse initial power and/or new UATI to the eAN that corresponds to the HRPD SectorID.

Figure 6:
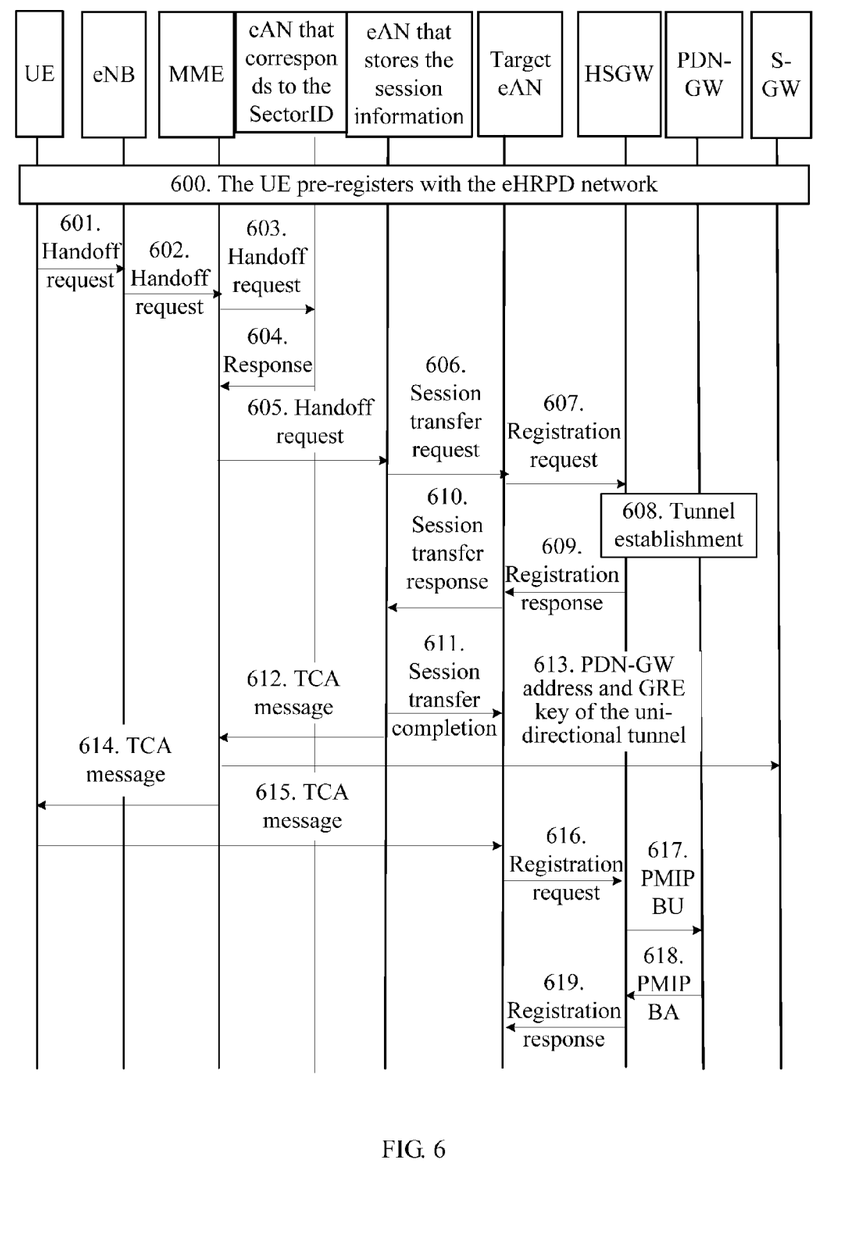
FIG. 6 is a flowchart of a network handoff method provided in an embodiment of the present invention.

A method for network handoff is provided in an embodiment of the present invention shown in FIG. 6. The method includes the following steps:

Step 600: The UE is currently in an LTE network but has pre-registered with the eHRPD network, and the eAN that completes pre-registration for the UE stores session information of the UE.

Step 601: The UE sends a network handoff request to the eNB to request access to the eHRPD network. The network handoff request includes HRPD Connection Request and Route Update Request.

Step 602: The eNB forwards the network handoff request to the MME, and adds the HRPD SectorID statically set by the eNB to the network handoff request.

Step 603: The MME adds a PDN-GW address and the GRE key of the uplink tunnel between the S-GW and the PDN-GW to the network handoff request, and forwards the network handoff request to the eAN that corresponds to the HRPD SectorID.

Step 604: If the eAN that corresponds to the HRPD SectorID detects that it is neither the eAN that stores the session information for the pre-registration of the UE nor the target eAN indicated by the parameter in the Route Update Request which the UE wants to access, it forwards a response containing the ID or address of the eAN that stores the session information to the MME to instruct the MME to connect to the eAN that stores the session information.

Step 605: The MME sends the network handoff request to the eAN that stores the session information of the UE.

Step 606: When the eAN that stores the session information of the UE detects that it is not the target eAN indicated by the parameter in the Route Update Request which the UE wants to access, the eAN sends a session transfer request to the target eAN.

Specifically, the eAN that stores the session information of the UE sends the target eAN a session transfer request containing the session information of the UE, the PDN-GW address, and the GRE key of the uplink tunnel between the S-GW and the PDN-GW.

Step 607: The target eAN sends a registration request containing the PDN-GW address and the GRE key of the uplink tunnel to the HSGW based on the session transfer request.

Step 608: Based on the PDN-GW address and the GRE key of the uplink tunnel, the HSGW establishes a temporary uplink tunnel between the HSGW and the PDN-GW, in which the uplink tunnel is used to forward uplink data after the UE switches to the eHRPD network.

Step 609: The HSGW sends the target eAN a registration response containing an HSGW address and the GRE key of the uni-directional tunnel from the S-GW to the HSGW.

Step 610: The target eAN allocates an air interface resource for the UE, updates session information based on settings of the target eAN, and sends a session transfer response containing updated session information, information about the air interface resource, HSGW address, and the GRE key of the uni-directional tunnel to the eAN that stores the session information.

In addition, the target eAN can set a reverse initial power used by the UE to access the eHRPD network, allocate a new UATI for the UE, and add the reverse initial power and/or new UATI to the session transfer response, and then send the session transfer response to the UE through the eAN that corresponds to the HRPD SectorID. In this way, the UE can smoothly access the eHRPD network by using the reverse initial power; the UE can also use the long code mask of the traffic channel which is generated based on the new UATI, so as to enable the UATI allocated by a source eAN to be released and then allocated by the source eAN for another UE.

Step 611: After receiving the session transfer response, the eAN that stores the session information stores the session information updated by the target eAN, and sends a session transfer completion message containing the updated session information to the target eAN to complete the session transfer.

Step 612: The eAN that stores the session information sends the HSGW address, the GRE key of the uni-directional tunnel, and the TCA message containing information about the air interface resource and the reverse initial power to the MME based on the session transfer response.

Step 613: The MME forwards the HSGW address and the GRE key of the uni-directional tunnel to the S-GW, so as to enable the S-GW to establish, based on the HSGW address and the GRE key of the uni-directional tunnel, a uni-directional tunnel from the S-GW to the HSGW, in which the uni-directional tunnel is used to forward the downlink data buffered in the LTE network to the eHRPD network. That is, the S-GW forwards the downlink data received sent the eNB to the HSGW through the uni-directional tunnel from the S-GW to the HSGW; the HSGW buffers the downlink data, and sends the downlink data to the UE after the UE switches to the eHRPD network.

Step 614: The MME sends a TCA message containing information about the air interface resource and the reverse initial power to the UE.

Step 615: The UE sends a TCC message to the target eAN based on the information about the air interface resource allocated by the target eAN and the reverse initial power.

Step 616: After receiving the TCC message, the target eAN sends a registration request to the HSGW to indicate that the UE is connected to the HRPD network. If the UE needs to send uplink data, it can send the data to the HSGW, which will send the data to the PDN-GW through the temporary uplink tunnel established in step 608.

Step 617: The HSGW sends a PMIP BU request to the PDN-GW to request the establishment of an S2a tunnel with the PDN-GW.

Step 618: The PDN-GW sends a PMIP BA message to the HSGW to indicate that the S2a tunnel is established successfully. After that, the HSGW no longer sends uplink data through the temporary uplink tunnel established in step 608, but forwards uplink data and downlink data through the S2a tunnel.

Step 619: The HSGW returns a registration response to the target eAN through A11 (shown in FIG. 1), and the UE switches to the eHRPD network.

In this embodiment of the present invention, the network handoff when the target eAN indicated in the handoff request sent by a UE is different from the eAN statically set by the eNB is implemented through the session transfer between the first eAN and the target eAN.

Those skilled in the art should understand the following: In step 612, if the eAN that stores the session information of the UE receives the reverse initial power and/or new UATI from the target eAN in step 610, it can also send the reverse initial power and/or new UATI to the MME.

Those skilled in the art should understand the following: In step 614, if the MME receives the reverse initial power and/or new UATI from the eAN that stores the session information of the UE, it can also send the reverse initial power and/or new UATI to the UE.

Figure 7:
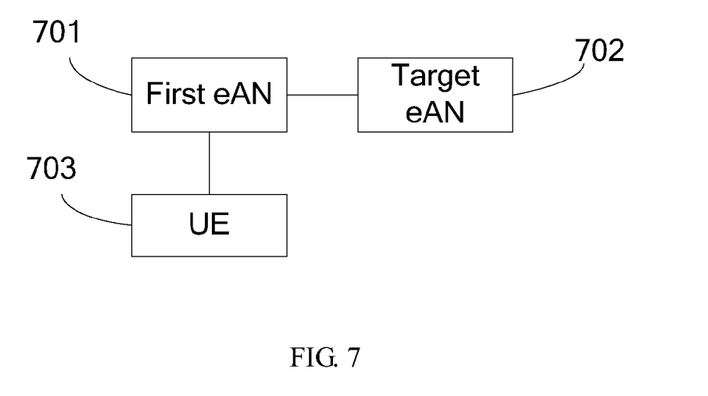
FIG. 7 illustrates architecture of a network handoff system provided in an embodiment of the present invention.

A system for network handoff is provided in an embodiment of the present invention shown in FIG. 7. The system includes a first eAN 701, a target eAN 702, and a UE 703, in which:

the first eAN 701 is configured to send a session transfer request to the target eAN 702 that corresponds to the session transfer request, receive a session transfer response from the target eAN 702, and send a TCA message to the UE 703 based on the session transfer response, so as to enable the UE 703 to switch from an LTE network to an eHRPD network based on the TCA message.

In this embodiment of the present invention, a system for network handoff is provided for the session transfer between the first eAN and the target eAN to implement the network handoff when the target eAN indicated in the handoff request sent by a UE is different from the eAN statically set by the eNB.

Figure 8:
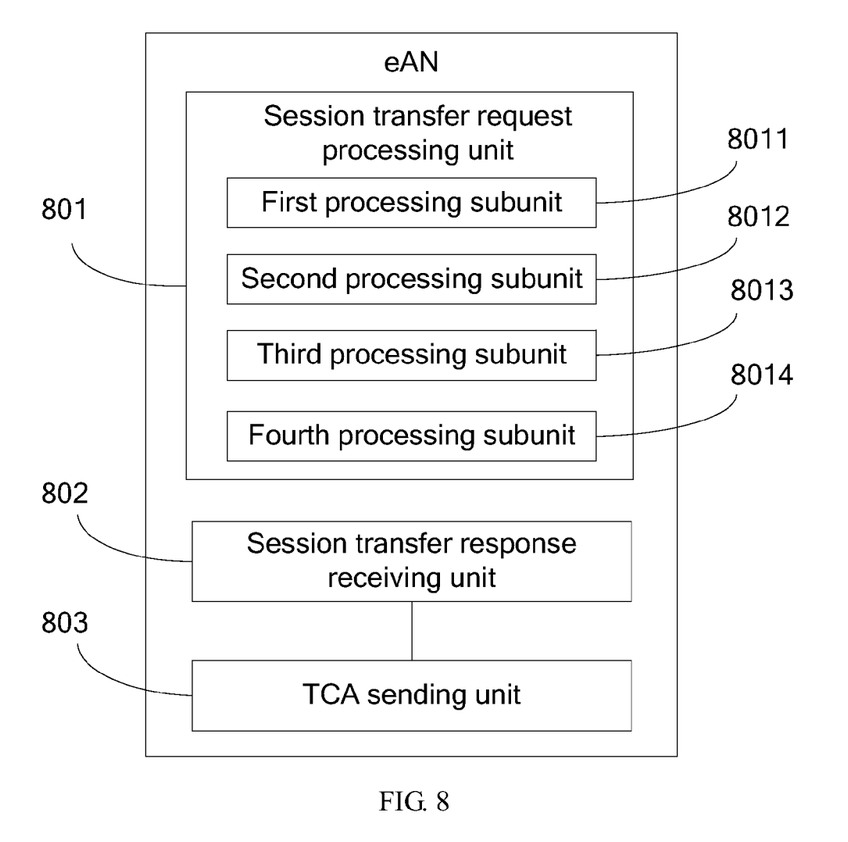
FIG. 8 illustrates architecture of an eAN provided in an embodiment of the present invention.

An eAN is provided in an embodiment of the present invention shown in FIG. 8. The eAN includes:

a session transfer request processing unit 801, configured to send a session transfer request to the target eAN that corresponds to the network handoff request;

a session transfer response receiving unit 802, configured to receive a session transfer response from the target eAN; and a TCA sending unit 803, configured to send a TCA message to a UE based on the session transfer response received by the session transfer response receiving unit 802, so as to enable the UE to switch from an LTE network to an eHRPD network based on the TCA message.

If the eAN is an eAN that corresponds to the SectorID, the session transfer request processing unit 801 includes:

a first processing subunit 8011, configured to send the session transfer request to the target eAN if the eAN that corresponds to the SectorID is the eAN that stores the session information of the UE; or a second processing subunit 8012, configured to obtain the session information of the UE from the eAN that stores the session information of the UE and sends the session transfer request to the target eAN if the eAN that corresponds to the SectorID is not the eAN that stores the session information of the UE.

If the eAN is an eAN that stores the session information of the UE, the session transfer request processing unit 801 includes:

a third processing subunit 8013, configured to receive a network handoff request from the eAN that corresponds to the SectorID and send the session transfer request to the target eAN based on the network handoff request; or a fourth processing subunit 8014, configured to receive a network handoff request from an MME and send a session transfer request to the target eAN based on the network handoff request.

The session transfer request processing unit 801 is specifically configured to send a session transfer request containing the session information of the UE, the PDN-GW address, and the GRE key of the uplink tunnel between the S-GW and the PDN-GW to the target eAN.

The session transfer response receiving unit 802 is specifically configured to:

receive, from the target eAN, a session transfer response containing information about the air interface resource, the HSGW address, and the GRE key of the uni-directional tunnel; or receive, from the target eAN, a session transfer response containing information about the air interface resource, the HSGW address, the GRE key of the uni-directional tunnel, and the reverse initial access power; or receive, from the target eAN, a session transfer response containing information about the air interface resource, the HSGW address, the GRE key of the uni-directional tunnel, and the new UATI; or receive, from the target eAN, a session transfer response containing information about the air interface resource, the HSGW address, the GRE key of the uni-directional tunnel, the reverse initial access power, and the new UATI.

The TCA sending unit 803 is specifically configured to:

send a TCA message containing information about the air interface resource to the UE based on the session transfer response; or send a TCA message containing information about the air interface resource and the reverse initial power to the UE based on the session transfer response; or send a TCA message containing information about the air interface resource and the new UATI to the UE based on the session transfer response; or send a TCA message containing information about the air interface resource, the reverse initial power, and the new UATI to the UE based on the session transfer response.

In this embodiment of the present invention, an eAN is provided for the session transfer between itself and the target eAN to implement the network handoff when the target eAN indicated in the handoff request sent by a UE is different from the eAN statically set by the eNB.

Figure 9:
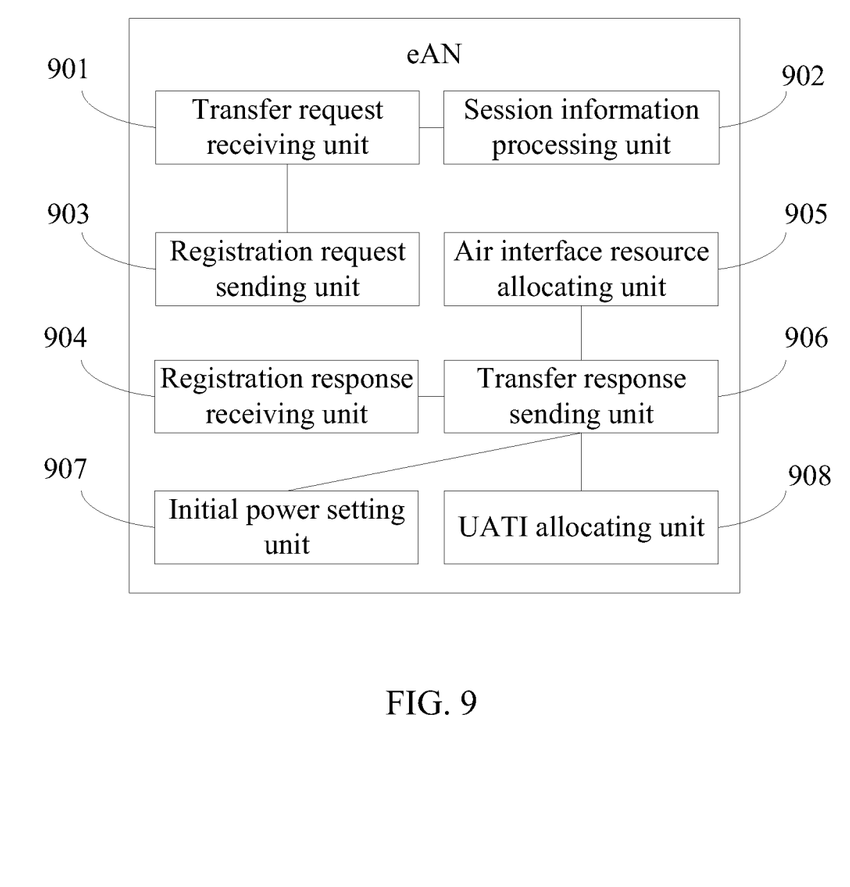
FIG. 9 illustrates architecture of an eAN provided in an embodiment of the present invention.

An eAN is provided in an embodiment of the present invention shown in FIG. 9. The eAN includes:

a transfer request receiving unit 901, configured to receive a session transfer request containing session information of the UE, a PDN-GW address, and a GRE key of the uplink tunnel between the S-GW and the PDN-GW;

a session information processing unit 902, configured to store the session information received by the transfer request receiving unit 901;

a registration request sending unit 903, configured to send an HSGW a registration request containing the PDN-GW address and the GRE key of the uplink tunnel received by the transfer response receiving unit 901, so as to enable the HSGW to send uplink data to the PDN-GW by using the PDN-GW address and the GRE key of the uplink tunnel;

a registration response receiving unit 904, configured to receive from the HSGW a registration response containing the HSGW address and the GRE key of the uni-directional tunnel from the S-GW to the HSGW;

an air interface resource allocating unit 905, configured to allocate air interface resource for a UE; and a transfer response sending unit 906, configured to send a session transfer response containing information about the air interface resource, the HSGW address, and the GRE key of the uni-directional tunnel.

The eAN further includes:

an initial power setting unit 907, configured to set the reverse initial power used by the UE to access an eHRPD network.

In this case, the transfer response sending unit 906 can be specifically configured to send a session transfer response containing information about the air interface resource, the HSGW address, the GRE key of the uni-directional tunnel, and the reverse initial access power.

The eAN further includes:

a UATI allocating unit 908, configured to allocate a new UATI for the UE.

In this case, the transfer response sending unit 906 can be specifically configured to send a session transfer response containing information about the air interface resource, the HSGW address, the GRE key of the uni-directional tunnel, and the new UATI.

In this embodiment of the present invention, an eAN is provided for the session transfer between itself and the target eAN to implement the network handoff when the target eAN indicated in the handoff request sent by a UE is different from the eAN statically set by the eNB.

Based on the description of the preceding embodiments, those skilled in the art can clearly understand that the present invention can be implemented through hardware or through software that runs on a necessary universal hardware platform. Therefore, the technical solutions of the present invention can be embodied in form of a software product; the software product can be stored in a non-volatile storage medium (for example, a CD-ROM, a USB disk, a portable hard disk), and incorporates a plurality of instructions to enable a computer (for example, a PC, a server, or a network device) to implement the methods provided in the embodiments of the present invention.

Described above are merely the exemplary embodiments of the present invention, so the embodiments of the present invention are not limited to these embodiments. Therefore, the equivalent modifications and variations made with reference to the embodiments of the present invention fall within the scope of the present invention.

What is claimed is:

1. A method for network handoff, the method comprising:
    sending, by a first evolved Access Network (eAN), a session transfer request to a target eAN that corresponds to a network handoff request, wherein the session transfer request contains session information of the UE, a Packet Data Network Gateway (PDN-GW) address, and a Generic Routing Encapsulation (GRE) key of an uplink tunnel between a Serving Gateway (S-GW) and the PDN-GW;
    receiving, by the first eAN, a session transfer response from the target eAN; and
    sending, by the first eAN, a Traffic Channel Assignment (TCA) message to a User Equipment (UE) based on the session transfer response, so as to enable the UE to switch from a Long Term Evolution (LTE) network to an evolved High Rate Packet Data (eHRPD) network based on the TCA message.

2. The method of claim 1, wherein the first eAN is an eAN that corresponds to a SectorID or an eAN that stores session information of the UE.

3. The method of claim 2, wherein sending the session transfer request comprises:
    sending the session transfer request to the target eAN from the eAN that corresponds to the SectorID if the eAN that corresponds to the SectorID is the eAN that stores the session information of the UE.

4. The method of claim 2, wherein sending the session transfer request comprises:
    if the eAN that corresponds to the SectorID is not the eAN that stores the session information of the UE, forwarding, by the eAN that corresponds to the SectorID, the network handoff request to the eAN that stores the session information of the UE to trigger the eAN that stores the session information of the UE to send the session transfer request to the target eAN.

5. The method of claim 2, wherein sending the session transfer request comprises:
    if the eAN that corresponds to the SectorID is not the eAN that stores the session information of the UE, sending, by the eAN that corresponds to the SectorID, a response to a Mobility Management Entity (MME), so as to enable the MME to send the network handoff request to the eAN that stores the session information of the UE to trigger the eAN that stores the session information of the UE to send the session transfer request to the target eAN.

6. The method of claim 2, wherein sending the session transfer request comprises:
    if the eAN that corresponds to the SectorID is not the eAN that stores the session information of the UE, obtaining, by the eAN that corresponds to the SectorID, the session information of the UE from the eAN that stores the session information of the UE, and sending the session transfer request to the target eAN.

7. The method of claim 1, wherein, after sending the target eAN the session transfer request, the method further comprises:
    receiving the session transfer request at the target eAN;
    storing the session information of the UE by the target eAN;

sending a registration request from the target eAN to a High Rate Packet Data Serving Gateway (HSGW), the registration request containing the PDN-GW address and the GRE key of the uplink tunnel based on the session transfer request, so as to enable the HSGW to send uplink data to the PDN-GW by using the PDN-GW address and the GRE key of the uplink tunnel;

receiving a registration response from the HSGW at the target eAN, the registration response containing an HSGW address and a GRE key of a uni-directional tunnel from the S-GW to the HSGW;

allocating, by the target eAN, an air interface resource for the UE; and sending, by the target eAN, the first eAN a session transfer response containing information about the air interface resource, the HSGW address, and the GRE key of the uni-directional tunnel.

8. The method of claim 7, further comprising:
setting, by the target eAN, a reverse initial power used by the UE to access the eHRPD network; and
sending, by the target eAN, the first eAN a session transfer response containing the information about the air interface resource, the HSGW address, the GRE key of the uni-directional tunnel, and the reverse initial access power.

9. The method of claim 7, further comprising:
allocating, by the target eAN, a new Unicast Access Terminal Identifier (UATI) for the UE; and
sending, by the target eAN, the first eAN a session transfer response containing the information about the air interface resource, the HSGW address, the GRE key of the uni-directional tunnel, and the new UATI.

10. The method of claim 1, wherein receiving a session transfer response from the target eAN comprises:
receiving a session transfer response containing information about an air interface resource, a High Rate Packet Data Serving Gateway (HSGW) address, and a Generic Routing Encapsulation (GRE) key of a uni-directional tunnel; or
receiving a session transfer response containing the information about the air interface resource, the HSGW address, the GRE key of the uni-directional tunnel, and a reverse initial power; or
receiving a session transfer response containing the information about the air interface resource, the HSGW address, the GRE key of the uni-directional tunnel, and a new Unicast Access Terminal Identifier (UATI); or
receiving a session transfer response containing the information about the air interface resource, the HSGW address, the GRE key of the uni-directional tunnel, the reverse initial power, and the new UATI.

11. The method of claim 1, wherein sending a Traffic Channel Assignment (TCA) message comprises:
sending a TCA message containing information about an air interface resource to the UE based on the session transfer response, so as to enable the UE to switch to the eHRPD network based on the information about the air interface resource carried in the TCA message; or
sending a TCA message containing the information about the air interface resource and a reverse initial power to the UE based on the session transfer response, so as to enable the UE to switch to the eHRPD network based on the information about the air interface resource and the reverse initial power carried in the TCA message; or
sending a TCA message containing the information about the air interface resource and a new Unicast Access Terminal Identifier (UATI) to the UE based on the session transfer response, so as to enable the UE to switch to the eHRPD network based on the information about the air interface resource and a long code mask of a traffic channel that corresponds to the new UATI carried in the TCA message; or
sending a TCA message containing the information about the air interface resource, the reverse initial power, and the new UATI to the UE based on the session transfer response, so as to enable the UE to switch to the eHRPD network based on the information about the air interface resource, the reverse initial power, and the long code mask of the traffic channel that corresponds to the new UATI carried in the TCA message.

12. An evolved Access Network (eAN), comprising:
a session transfer request processing unit, configured to send a network handoff request to a target eAN that corresponds to a network handoff request, wherein the session transfer request processing unit is specifically configured to send the target eAN a session transfer request containing session information of the UE, a Packet Data Network Gateway (PDN-GW) address, and a Generic Routing Encapsulation (GRE) key of an uplink tunnel between a Serving Gateway (S-GW) and the PDN-GW;
a session transfer response receiving unit, configured to receive a session transfer response from the target eAN; and
a Traffic Channel Assignment (TCA) sending unit, configured to send a TCA message to a User Equipment (UE) based on the session transfer response received by the session transfer response receiving unit, so as to enable the UE to switch from a Long Term Evolution (LTE) network to an evolved High Rate Packet Data (eHRPD) network based on the TCA message.

13. The eAN of claim 12, wherein the eAN is an eAN that corresponds to a SectorID carried in the network handoff request, and wherein the session transfer request processing unit comprises:
a first processing subunit, configured to send the session transfer request to the target eAN if the eAN is also an eAN that stores session information of the UE; or
a second processing subunit, configured to obtain the session information of the UE from the eAN that stores the session information of the UE and to send the session transfer request to the target eAN.

14. The eAN of claim 12, wherein the eAN is an eAN that stores session information of the UE, and wherein the session transfer request processing unit comprises:
a third processing subunit, configured to receive a network handoff request from an eAN that corresponds to a SectorID carried in the network handoff request and to send the session transfer request to the target eAN based on the network handoff request; or
a fourth processing subunit, configured to receive a network handoff request from a Mobility Management Entity (MME) and to send the session transfer request to the target eAN based on the network handoff request.

15. The eAN of claim 12, wherein the session transfer response receiving unit is specifically configured to:
receive, from the target eAN, a session transfer response containing information about an air interface resource, a High Rate Packet Data Serving Gateway (HSGW) address, and the GRE key of a uni-directional tunnel; or
receive, from the target eAN, a session transfer response containing the information about the air interface resource, the HSGW address, the GRE key of the uni-directional tunnel, and a reverse initial power; or receive, from the target eAN, a session transfer response containing the information about the air interface resource, the HSGW address, the GRE key of the uni-directional tunnel, and a new Unicast Access Terminal Identifier (UATI); or receive, from the target eAN, a session transfer response containing the information about the air interface resource, the HSGW address, the GRE key of the uni-directional tunnel, the reverse initial power, and the new UATI.

16. The eAN of claim 12, wherein the TCA sending unit is specifically configured to:

send a TCA message containing information about an air interface resource to the UE based on the session transfer response; or send a TCA message containing the information about the air interface resource and a reverse initial power to the UE based on the session transfer response; or send a TCA message containing the information about the air interface resource and a new Unicast Access Terminal Identifier (UATI) to the UE based on the session transfer response; or send a TCA message containing the information about the air interface resource, the reverse initial power, and the new UATI to the UE based on the session transfer response.

17. An evolved Access Network (eAN), comprising:

a transfer request receiving unit, configured to receive a session transfer request containing session information of a User Equipment (UE), a Packet Data Network Gateway (PDN-GW) address, and a Generic Routing Encapsulation (GRE) key of an uplink tunnel between a Serving Gateway (S-GW) and the PDN-GW;

a session information processing unit, configured to store the session information received by the transfer request receiving unit;

a registration request sending unit, configured to send a High Rate Packet Data Serving Gateway (HSGW) a registration request containing the PDN-GW address and the GRE key of the uplink tunnel received by the transfer response receiving unit, so as to enable the HSGW to send uplink data to the PDN-GW by using the PDN-GW address and the GRE key of the uplink tunnel;

a registration response receiving unit, configured to receive, from the HSGW, a registration response containing an HSGW address and a GRE key of a uni-directional tunnel from the S-GW to the HSGW;

an air interface resource allocating unit, configured to allocate an air interface resource for the UE; and a transfer response sending unit, configured to send a session transfer response containing information about the air interface resource, the HSGW address, and the GRE key of the uni-directional tunnel.

18. The eAN of claim 17, further comprising:

an initial power setting unit, configured to set a reverse initial power used by the UE to access an evolved High Rate Packet Data (eHRPD) network;

wherein the transfer response sending unit is configured to send a session transfer response containing the information about the air interface resource, the HSGW address, the GRE key of the uni-directional tunnel, and the reverse initial power.

19. The eAN of claim 17, further comprising:

a Unicast Access Terminal Identifier (UATI) allocating unit, configured to allocate a new UATI for the UE;

wherein the transfer response sending unit is configured to send a session transfer response containing the information about the air interface resource, the HSGW address, the GRE key of the uni-directional tunnel, and the new UATI.

20. A method for network handoff, the method comprising:

receiving a session transfer request containing session information of a User Equipment (UE), a Packet Data Network Gateway (PDN-GW) address, and a Generic Routing Encapsulation (GRE) key of an uplink tunnel between a Serving Gateway (S-GW) and the PDN-GW;

storing the session information;

sending a High Rate Packet Data Serving Gateway (HSGW) a registration request containing the PDN-GW address and the GRE key of the uplink tunnel, so as to enable the HSGW to send uplink data to the PDN-GW by using the PDN-GW address and the GRE key of the uplink tunnel;

receiving, from the HSGW, a registration response containing an HSGW address and a GRE key of a uni-directional tunnel from the S-GW to the HSGW;

allocating an air interface resource for the UE; and sending a session transfer response containing information about the air interface resource, the HSGW address, and the GRE key of the uni-directional tunnel.

21. The method of claim 20, wherein the session transfer response further comprises a reverse initial power.

* * * * *